(12) United States Patent
Shimada et al.

(10) Patent No.: US 7,176,645 B2
(45) Date of Patent: Feb. 13, 2007

(54) CONTROL APPARATUS FOR ELECTRIC RAILCAR

(75) Inventors: Motomi Shimada, Hitachinaka (JP); Akira Horie, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 3 days.

(21) Appl. No.: 11/107,737

(22) Filed: Apr. 18, 2005

(65) Prior Publication Data

US 2005/0184693 A1 Aug. 25, 2005

Related U.S. Application Data

(63) Continuation of application No. 10/601,629, filed on Jun. 24, 2003, now abandoned.

(30) Foreign Application Priority Data

Jun. 28, 2002 (JP) ............................. 2002-188978

(51) Int. Cl.
*H02P 7/00* (2006.01)
(52) U.S. Cl. ...................... 318/432; 318/434; 318/436; 318/371; 318/374; 318/376; 701/19; 701/20
(58) Field of Classification Search ........ 318/430–436, 318/371–376; 701/19–20
See application file for complete search history.

(56) References Cited

U.S. PATENT DOCUMENTS

| | | | |
|---|---|---|---|
| 3,899,725 A | 8/1975 | Plunkett | |
| 4,000,872 A * | 1/1977 | Grundy | .................. 346/182 R |
| 4,785,225 A | 11/1988 | Horie et al. | |
| 5,010,283 A * | 4/1991 | Kitajima et al. | ............. 318/373 |
| 5,184,049 A * | 2/1993 | Kiuchi | ........................ 318/362 |
| 5,677,610 A | 10/1997 | Tanamachi et al. | |
| 5,757,153 A | 5/1998 | Ito et al. | |
| 5,896,283 A | 4/1999 | Usami | |
| 5,992,950 A * | 11/1999 | Kumar et al. | ................ 303/151 |
| 6,456,909 B1 * | 9/2002 | Shimada et al. | ............... 701/22 |
| 6,831,432 B2 * | 12/2004 | Murakami | .................... 318/362 |
| 2003/0043609 A1 * | 3/2003 | Ishida et al. | ................... 363/95 |
| 2003/0052642 A1 * | 3/2003 | Kerkman et al. | ............. 318/801 |
| 2004/0000888 A1 * | 1/2004 | Shimada et al. | ............. 318/432 |

FOREIGN PATENT DOCUMENTS

EP 0 031 710 A1 7/1981

(Continued)

*Primary Examiner*—Lincoln Donovan
*Assistant Examiner*—Tyrone Smith
(74) *Attorney, Agent, or Firm*—Antonelli, Terry, Stout and Kraus, LLP.

(57) ABSTRACT

A control apparatus for an electric railcar that provides control so that when rotational speed of a motor decreases below a required value, torque of the motor will decrease at a required rate of change, a current limiter for limiting a torque current command "(A)Iqp" output from a current command arithmetic unit is provided to ensure that when the rotational speed of the motor decreases below the required value, the torque current command will be limited to a command value "(B)Iqp" smaller than that command value, and to ensure that a carrier frequency at which PWM signals are created when switching elements of the electric power converter are controlled by carrier generator is controlled to become lower than a carrier frequency existing when the rotational speed of the motor decreases below the required value.

8 Claims, 5 Drawing Sheets

FOREIGN PATENT DOCUMENTS

| | | |
|---|---|---|
| EP | 1 077 527 A1 | 2/2001 |
| JP | 3-164003 | 7/1991 |
| JP | 7-212911 | 8/1995 |
| JP | 2001-251701 | 9/2001 |
| JP | 2002-034101 A | 1/2002 |
| JP | 2002-171602 A | 6/2002 |

* cited by examiner

CONTROL APPARATUS FOR ELECTRIC RAILCAR

CROSS REFERENCE TO RELATED APPLICATION

This application is a continuation of U.S. application Ser. No. 10/601,629, filed Jun. 24, 2003, now abandoned, the contents of which are incorporated herein be reference.

FIELD OF THE INVENTION

The present invention relates to a control apparatus for an electric railcar, and more particularly to a control apparatus for an electric railcar which stops by means of an electric brake.

BACKGROUND OF THE INVENTION

The mainstream in conventional brake control methods for electric railcars is the "electropneumatic-blending brake control method" that uses an electric brake and a pneumatic brake in combination. Under this method, when speed decreases below the required value, regenerative (electric) braking force will decrease in steps. Conversely, pneumatic braking force will gradually increase at the same time until the electric railcar has stopped, and the electric railcar will finally stop only by means of the pneumatic brake. Changeover from the electric brake to the pneumatic brake is controlled so that the total braking force of both brakes becomes constant, and thereby, approximately constant retardation force is maintained until the electric railcar has stopped.

The brake control method usually adopted for recent electric railcars, however, is the "fully-electric brake final-velocity control (electric stopping brake control)" method in which regenerative (electric) braking force is exerted until the electric rail car has stopped. This method is very valid for realizing accurate stopping position control during automatic operation, since highly accurate torque response characteristics can be maintained even in the vicinity of speed zero.

This fully-electric brake final-velocity control (electric stopping brake control)" method is actually realized for the control apparatus for an electric railcar, described in, for example, Japanese Application Patent Laid-open Publication No. 2001-251701.

Under the electropneumatic-blending brake control method, regenerative (electric) braking force starts decreasing in steps from a speed of about 10 km/h, and at a speed of at least 1 km/h, the regenerative (electric) braking force completely decreases to zero. That is to say, regenerative (electric) braking force is not completely exerted in the vicinity of speed zero, such as speeds less than 1 km/h.

Under the fully-electric brake final-velocity control (electric stopping brake control) method, however, the desired regenerative (electric) braking force is exerted until the vicinity of speed zero has been reached, and the selection of the optimal regenerative (electric) braking force is abruptly started in the region from the vicinity of speed zero towards speed zero. That is to say, regenerative (electric) braking force is exerted in the vicinity of speed zero, such as speeds less than 1 km/h.

Most of recent electric railcars employ motor torque control based on PWM inverter control, and when the presence/absence of braking force in the vicinity of speed zero during regenerative (electric) braking is considered, the following problems can be assumed:

When the regenerative (electric) brake continues to operate until the electric railcar has stopped, brake mode control is transferred to a negative-phase brake mode (reversing/power driving mode) through an inverter frequency zero point. During passage through this inverter frequency zero point, there may occur the current concentration in which switching elements of either a U-, V-, or W-phase maintain a high conduction ratio. Heat loss due to the current concentration can cause abrupt increases in the temperatures of the switching elements, hereby accelerating the deterioration thereof or according to conditions, leading to element destruction.

SUMMARY OF THE INVENTION

An object of the present invention is to provide a control apparatus for an electric railcar which stops by means of an electric brake, and more particularly, such a control apparatus for an electric railcar for reducing the switching elements' heat loss occurring when the operating frequency for PWM inverter control (that is to say, the inverter frequency) passes through a zero point, and thereby maintaining sufficient braking force until the electric railcar has stopped.

In order to solve the above problems, the control apparatus for an electric railcar that provides control so that when the rotational speed of an internal motor decreases below the required value, the torque of the motor will decrease at the required rate of change is provided with: a means for providing control so that when the rotational speed of the above-mentioned motor reaches the speed region of the required speed or less during retardation, the torque of the motor will be smaller than the specified torque value existing when the rotational speed of the motor decreases below the required value, and; a means for providing control so that the carrier frequency at which PWM signals are created during the control of the switching elements constituting an electric power converter will be lower than the carrier frequency existing when the rotational speed of the motor decreases below the required value.

According to the present invention, in a control apparatus for an electric railcar, the amounts of current flow through switching elements are reduced beforehand so that when a regenerative (electric) brake continues to operate until the electric railcar has stopped, the electrical conduction loss in the switching elements during passage through an inverter frequency zero point stays within the characteristic performance limits of the elements.

Furthermore, the carrier frequency at which PWM signals are created when the switching elements are controlled beforehand so that the switching loss in the switching elements during passage through the inverter frequency zero point stays within the characteristic performance limits of the elements is also reduced.

DESCRIPTION OF THE PREFERRED EMBODIMENTS

The preferred embodiments of the present invention are described below using drawings.

Figure 1:
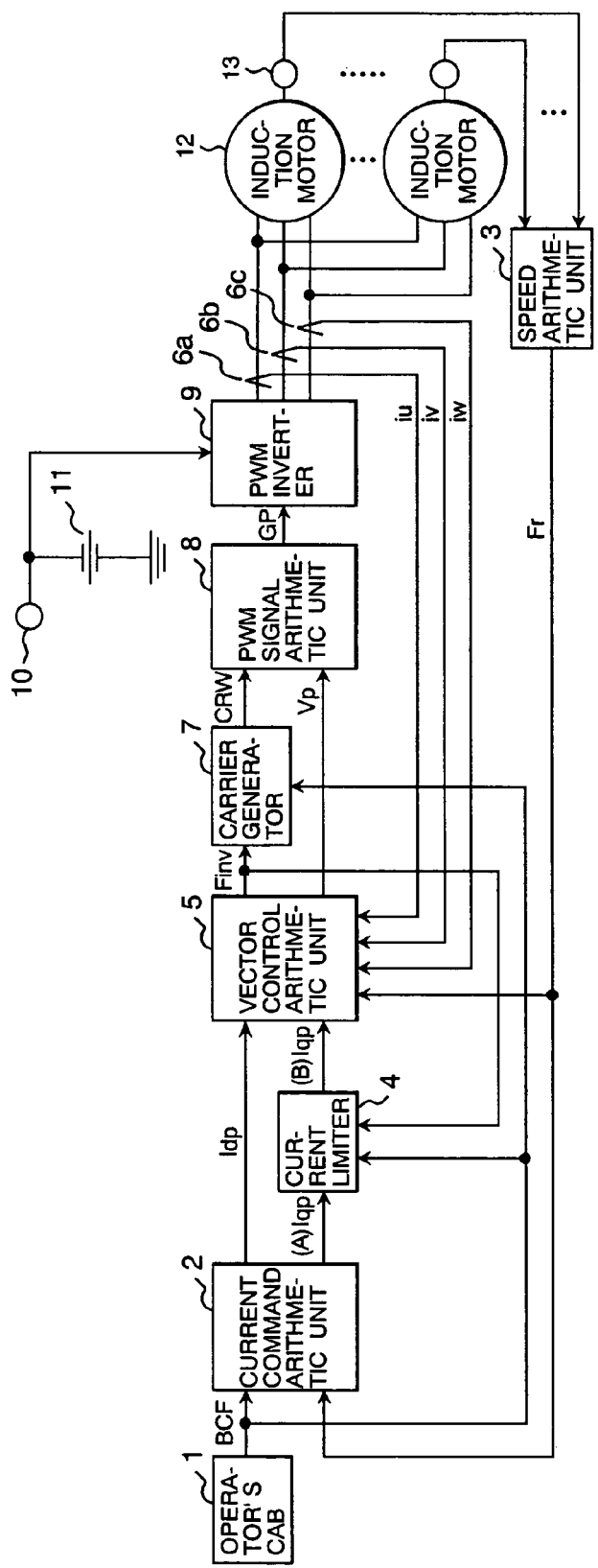
FIG. 1 is a block diagram showing a first embodiment of the control apparatus for an electric railcar that pertains to the present invention.

FIG. 1 is a block diagram showing a first embodiment of the control apparatus for an electric railcar that pertains to the present invention.

An operator's cab 1 outputs a braking command flag "BCF" that turns on only during braking. A current command arithmetic unit 2 receives, as its inputs, a braking command flag "BCF" and a reference rotational speed signal "Fr" output from the speed arithmetic unit 3 described later in this document, and outputs an excitation current command "Idp" and a torque current command "(A)Iqp". A current limiter 4 receives, as its inputs, the braking command flag "BCF", the torque current command "(A)Iqp", and an inverter frequency "Finv" that becomes a reference frequency of the AC voltage waveform created by the PWM inverter described later, and outputs a torque current command "(B)Iqp" that limits the torque current command "(A)Iqp". A vector control arithmetic unit 5 receives, as its inputs, the excitation current command "Idp", the torque current command "(B)Iqp", motor current detection values "iu", "iv", and "iw" by current detectors 6a, 6b, and 6c, and a reference rotational speed signal "Fr" output from the speed arithmetic unit 3, and outputs an inverter output voltage command "Vp" and an inverter frequency "Finv" that becomes a reference frequency of the AC voltage waveform created by the PWM inverter described later. A carrier generator 8 receives the inverter frequency "Finv" as its input, and outputs a carrier "CRW" for converting the inverter output voltage command "Vp" into a PWM signal. A PWM signal arithmetic unit 8 receives the inverter frequency "Finv" as its input, and outputs performs arithmetic operations on the gate signal GP that drives the switching elements constituting the main circuits of the PWM inverter 8. A PWM inverter 9 converts the DC power obtained from a DC power supply 10 via a filter capacitor 11 into three-phase AC power and supplies the AC power to an induction motor 13. A rotational speed detector 13 detects the rotational speed of the induction motor 12 and converts this speed signal into a reference rotational speed signal "Fr" at the speed arithmetic unit 3.

Although two induction motors 12 driven by the PWM inverter and two rotational speed detectors 13 for detecting the rotational speeds of the induction motors 13 are shown as sets in FIG. 1, this configuration does not provide for the number of induction motors 12 and rotational speed detectors 13; the configuration can include either one set of induction motors 12 and rotational speed detectors 13 or three, four, or up to the desired number of sets of these elements.

The current limiter 4 limits the maximum value of the torque current command "(A)Iqp" so that the heat loss occurring during the operation of the switching elements constituting the main circuits of the PWM inverter 9 does not exceed the maximum permissible limit of specifications. The purpose of the limitation is to minimize the conduction loss occurring in the switching elements, by limiting the values of the currents flowing mainly into the elements.

This limit value of the torque current command "(A)Iqp" is derived beforehand from the permissible values (specifications or measured data) against the heat loss of the switching elements. Also, since the torque current command "(A)Iqp" needs to be limited particularly in the vicinity of inverter frequency zero and hereby since the limit value is to be variable according to the particular inverter frequency, the limit value of the torque current command "(A)Iqp" with respect to the inverter frequency is assigned as a table. Although the maximum value of the torque current command "(A)Iqp" is limited in accordance with this table, this limitation applies only during braking, that is to say, when the braking command flag "BCF" is on; during power-driving and coasting states, in which no brakes are in operation, the torque current command "(A)Iqp" is not limited and the torque current command "(B)Iqp" is output as it is.

Because of the limitation by these torque current commands, there can occur the case that the regenerative (electric) braking force corresponding to the braking force command cannot be obtained. The retardation force required, however, can be obtained by providing control so that the insufficiency of the regenerative (electric) braking force with respect to the braking force command is compensated for by a mechanical braking device such as a pneumatic brake.

In order for the heat loss during the operation of the switching elements constituting the main circuits of the PWM inverter 9 not to exceed the maximum permissible limit of specifications, the carrier frequency at which the PWM signals for controlling the switching elements are created is reduced from a normal carrier frequency (A) to a carrier frequency (B) by a carrier generator 7. The reduction is mainly intended to minimize the switching loss of the elements that increases according to the particular on/off repeat times of the switching elements.

The carrier frequency (B) to which the normal carrier frequency has been reduced is derived beforehand from the permissible values (specifications or measured data) with respect to the heat loss in the switching elements, and the carrier frequency (B) is approximately set to the range from 100 to 500 Hz. Also, the reduction of the carrier frequency occurs before the inverter frequency passes through its zero point during retardation. For this reason, the inverter frequency detector 19 (see FIG. 4) described later in this document is provided to detect the fact that the inverter frequency has decreased below the required value, thereby the carrier frequency is reliably reduced from the normal carrier frequency (A) to the carrier frequency (B) before the inverter frequency passes through its zero point during retardation. Such reduction of the carrier frequency applies only during braking, that is to say, when the braking command flag "BCF" is on, and the carrier frequency is not reduced during power driving.

Figure 2:
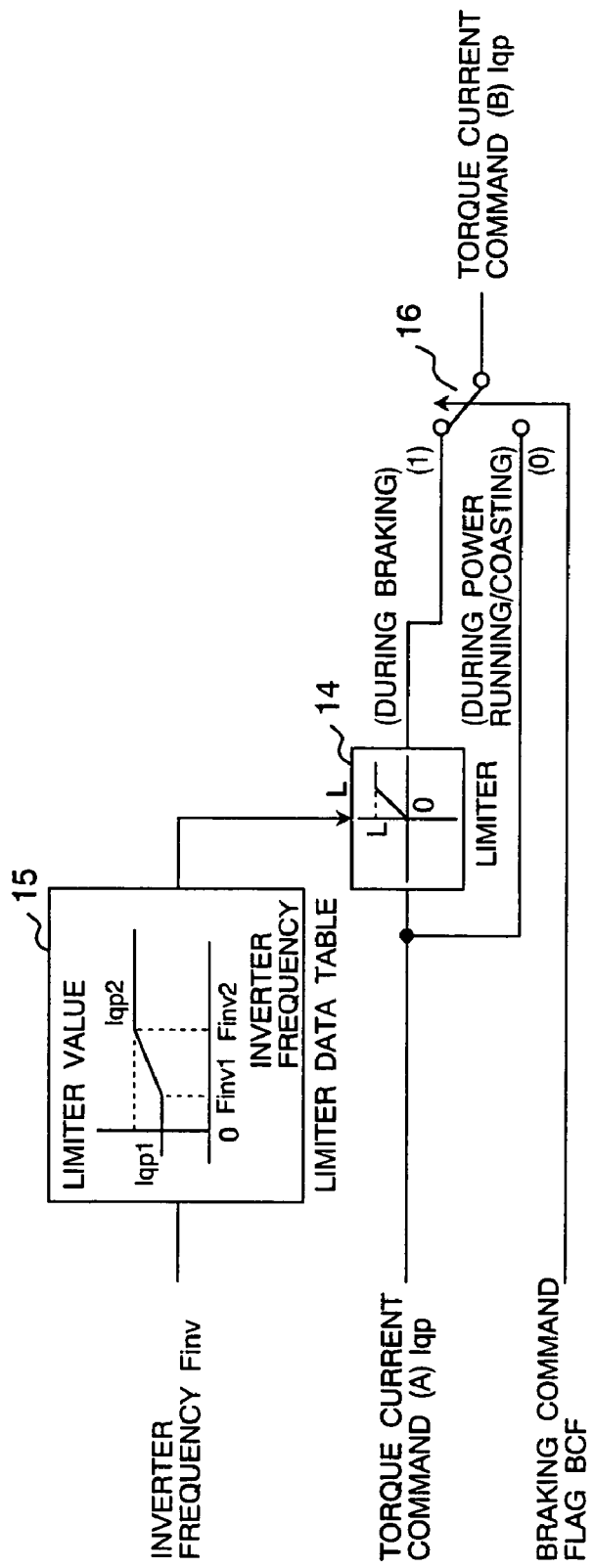
FIG. 2 is a block diagram showing the function of the current limiter in the present embodiment.

FIG. 2 is a block diagram showing the function of the current limiter in the present embodiment. Numerals 14, 15, and 16 in FIG. 2 denote the limiter, the limiter data table, and a selector, respectively.

The maximum value of the torque current command "(A)Iqp" is limited by the current limiter 14. When the inverter frequency "Finv" is "Finv2" or more, the limiter value is "Iqp2", and as the inverter frequency "Finv" decreases from "Finv2" to "Finv1", the limiter value will be reduced from "Iqp2" to "Iqp1". To reduce the conduction loss in the switching elements that occurs when the inverter frequency passes through its zero point, the limiter value of the current limiter 14 needs to be "Iqp1" before the inverter frequency "Finv" is zero, and thus "Finv" is set to a value greater than zero.

The limiter value of the current limiter 14 is determined from the limiter data table 15 in accordance with the inverter frequency "Finv". The torque current command "(B)Iqp" judges that when the braking command flag "BCF" is on, braking is in operation, and selects the output value of the current limiter 14, or judges that when "BCF" is off (logical 0), power driving or coasting is in progress, and selects the torque current command "(A)Iqp" by means of the selector 16 in accordance with the braking command flag "BCF" so that "(A)Iqp" is output as it is.

Figure 3:
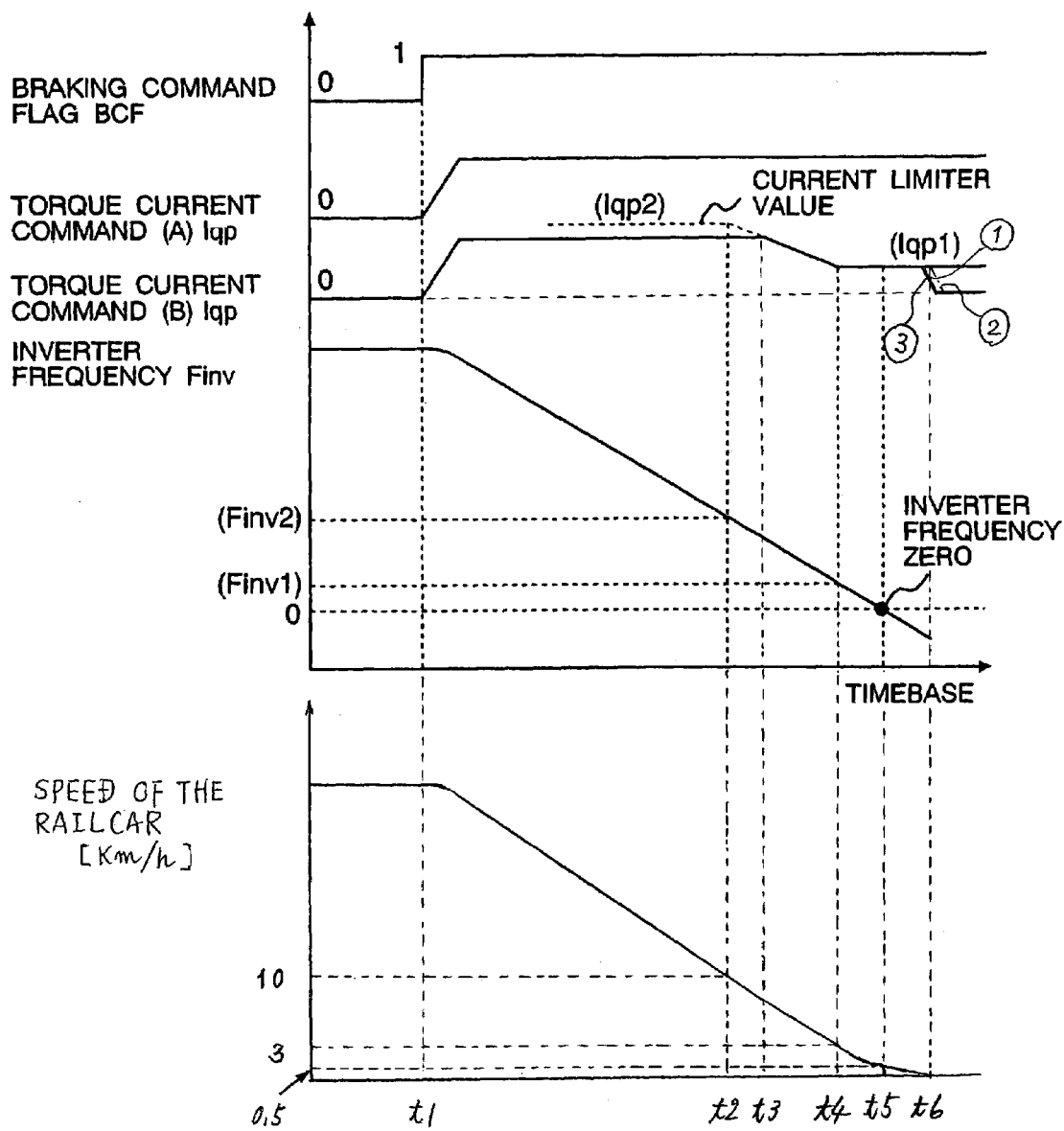
FIG. 3 is a waveform diagram showing the relationship in timing between the input and output signals of the current limiter in the present embodiment.

FIG. 3 is a waveform diagram showing the relationship in timing between the input and output signals of the current limiter in the present embodiment. After the "on" (logical 1) status of the braking command flag "BCF" has been detected, the torque current command "(A)Iqp" is reduced to a current value equivalent to the necessary braking force. Since the limiter value of the current limiter gradually decreases from "Iqp2" to "Iqp1" during the reduction of the inverter frequency "Finv" from "Finv2" to "Finv1", the torque current command "(B)Iqp" is output as the value obtained as a result of limiting the torque current command "(A)Iqp" according to the particular limiter value. To minimize the conduction loss in the switching elements that occurs when the inverter frequency passes through its zero point, the limiter value of the current limiter 14 needs to be "Iqp1" when the inverter frequency "Finv" is zero, and thus "Finv" is set to a value greater than zero.

Although the braking force required of the regenerative (electric) brake cannot be obtained with this torque current command "(B)Iqp", the necessary retardation force can be obtained by providing control so that the insufficiency of the regenerative (electric) braking force with respect to the braking force command is compensated for by a mechanical braking device such as a pneumatic brake.

In the present embodiment, by adopting the above configurations, it is possible to realize a control apparatus for an electric railcar which stops by means of an electric brake, and more particularly to realize such a control apparatus for an electric railcar that enables the maximum value of the torque current command during the passage of the operating frequency for PWM inverter control (that is to say, the inverter frequency) through its zero point to be limited, conduction loss in the switching elements to be minimized by limiting the value of the current flowing into the switching elements, and thereby, sufficient braking force to be maintained until the electric railcar has stopped.

Figure 4:
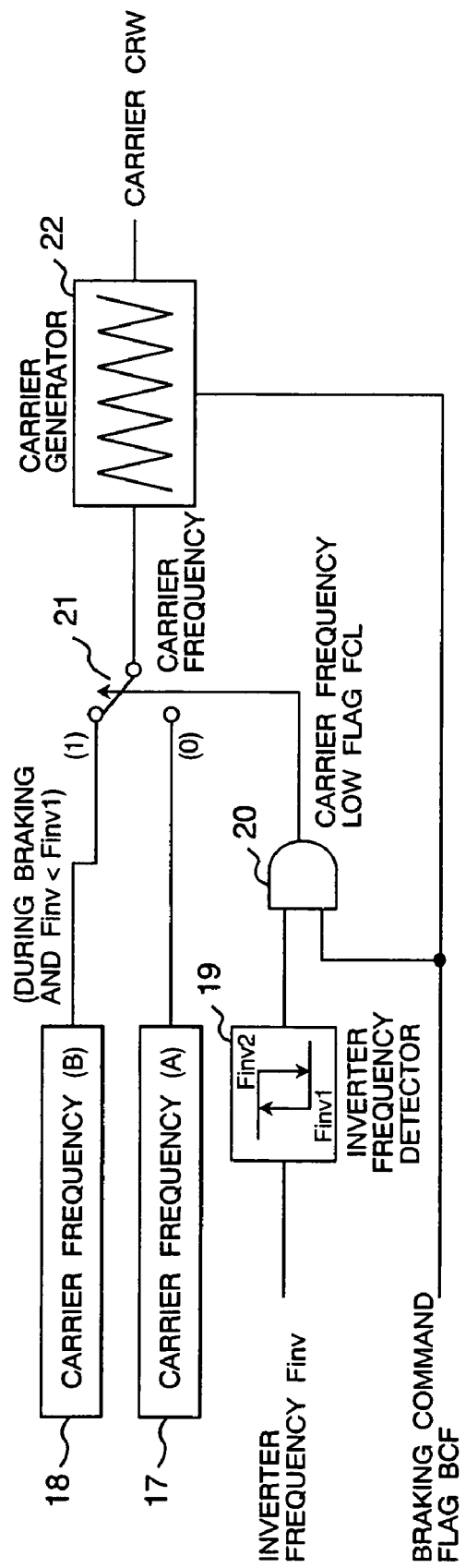
FIG. 4 is a block diagram showing the function of the carrier generator in the present embodiment.

FIG. 4 is a block diagram showing the function of the carrier generator in the present embodiment. Numerals 17, 18, 19, 20, 21, and 22 in FIG. 2 denote a carrier frequency (A) setting section, a carrier frequency (B) setting section, an inverter frequency detecting section, a logical multiplying circuit, a selector, and a carrier-generating section, respectively.

The carrier frequency (A) is a carrier frequency applied to normal regenerative (electric) braking, and is synthetically determined with the specifications of the switching elements, the method of PWM inverter control, the higher-harmonic components of the inverter current, and other factors taken into consideration. The carrier frequency (A) here is not always a constant and may change according to the particular output voltage command of the inverter. The carrier frequency (B) is set beforehand based on the permissible values (specifications or measured data) with respect to the heat loss in the switching elements, and is approximately set to the range from 100 to 500 Hz.

When the facts that the braking command flag "BCF" is on (logical 1) and that the inverter frequency is "Finv2" or less are detected by the inverter frequency detector 19, the logical multiplying circuit 20 will turn on a carrier frequency reduction flag "FCL" and after sending the corresponding "on" signal (logical 1), switch the selector 21 from the carrier frequency (A) to the carrier frequency (B). The carrier-generating section 22 generates a carrier "CRW" corresponding to the said carrier frequency (B) during the "on" duration of the braking command flag "BCF".

Figure 5:
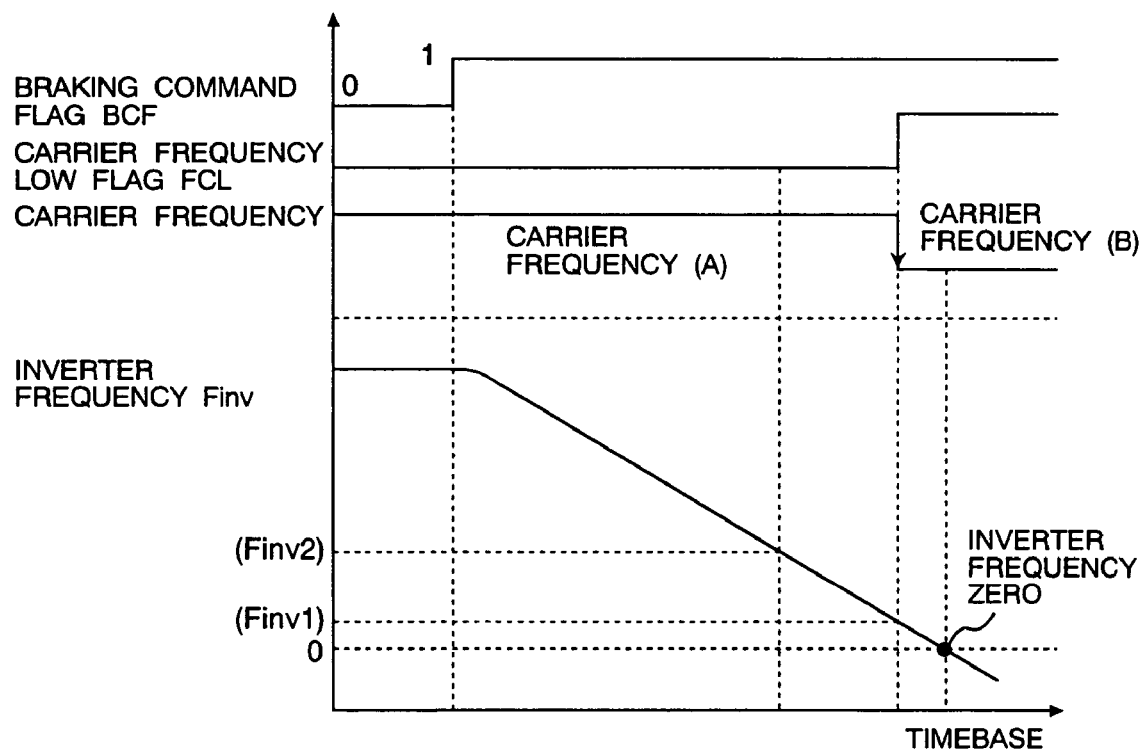
FIG. 5 is a waveform diagram showing the relationship in timing between the input and output signals of the carrier generator in the present embodiment.

FIG. 5 is a waveform diagram showing the relationship in timing between the input and output signals of the carrier generator in the present embodiment.

When the braking command flag "BCF" has entered the "on" (logical 1) status, if the inverter frequency is "Finv2" or more, the carrier frequency is the carrier frequency (A). During retardation, when the inverter frequency "Finv" has reached "Finv1", the carrier frequency reduction flag "FCL" turns on and the carrier frequency changes from the carrier frequency (A) to the carrier frequency (B). Since the reduction of the carrier frequency needs to be completed before the inverter frequency becomes zero, "Finv1" is set to a value greater than zero.

In the present embodiment, by adopting the above configurations, it is possible to realize a control apparatus for an electric railcar which stops by means of an electric brake, and more particularly to realize such a control apparatus for an electric railcar that enables: the switching loss of the elements that increases according to the particular on/off repeat times of the switching elements, to be minimized by reducing the carrier frequency existing when the operating frequency for PWM inverter control (that is to say, the inverter frequency) through its zero point, and; thereby, heat loss to be minimized and sufficient braking force to be maintained until the electric railcar has stopped.

Next, the second embodiment of the control apparatus for an electric railcar that pertains to the present invention is explained.

Although the present second embodiment is of much the same configuration as that of the first embodiment shown in FIG. 1, the second embodiment of the present invention differs from the first embodiment thereof in that when the operating frequency for PWM inverter control (that is to say, the inverter frequency) through its zero point, the carrier generator 7 does not change the carrier frequency from the carrier frequency (A) to the carrier frequency (B). Therefore, on/off control of the switching elements constituting the main circuits of the PWM inverter 8 is conducted at the carrier frequency (A).

Under the present embodiment, however, as described in FIGS. 2 and 3, limiting the current flowing into the switching elements by limiting, via the current limiter 14, the maximum value of the torque current command during the passage of the operating frequency for PWM inverter control (that is to say, the inverter frequency) through its zero point, is executed similarly to the first embodiment of the present invention.

Hereby, it is possible in the present embodiment to realize a control apparatus for an electric railcar which stops by means of an electric brake, and more particularly to realize such a control apparatus for an electric railcar that enables: the conduction loss in the switching elements during the passage of the operating frequency for PWM inverter control (that is to say, the inverter frequency) through its zero point, to be minimized, and; thereby, heat loss to be minimized and sufficient braking force to be maintained until the electric railcar has stopped.

Next, the third embodiment of the control apparatus for an electric railcar that pertains to the present invention is explained.

The present third embodiment differs from the first embodiment shown in FIG. 1, in that such current limiter 14 as used in the first embodiment is deleted (i.e. "(B)Iqp"="(A)Iqp"), and all other structural aspects are the same.

Under the present third embodiment, however, as described in FIGS. 4 and 5, reducing, by means of the current limiter 14, the carrier frequency from the carrier frequency (A) to the carrier frequency (B) during the passage of the operating frequency for PWM inverter control (that is to say, the inverter frequency) through its zero point, is executed similarly to the first embodiment of the present invention.

Hereby, it is also possible in the present embodiment to realize a control apparatus for an electric rail car which stops by means of an electric brake, and more particularly to realize such a control apparatus for an electric railcar that enables: the switching loss in the switching elements that increases according to the particular on/off repeat times of the elements, to be minimized by reducing the carrier frequency existing when the operating frequency for PWM inverter control (that is to say, the inverter frequency) passes through its zero point, and; thereby, heat loss to be minimized and sufficient braking force to be maintained until the electric railcar has stopped.

As heretofore described, according to the present invention, in a control apparatus for an electric railcar which stops by means of an electric brake, it is possible to reduce the electrical conduction loss in the switching elements by limiting the torque current command especially when the operating frequency for PWM inverter control (that is to say, the inverter frequency) passes through its zero point, and then limiting the value of the current flowing into the switching elements, and thereby to minimize heat loss and to maintain sufficient braking force until the electric railcar has stopped.

In addition, in a control apparatus for an electric railcar which stops by means of an electric brake, the switching loss in the switching elements that increases according to the particular on/off repeat times of the elements can be reduced by lowering the carrier frequency existing when the operating frequency for PWM inverter control (that is to say, the inverter frequency) passes through its zero point, and thereby, not only heat loss can be reduced, but also sufficient braking force can be maintained until the electric railcar has stopped.

What is claimed is:

1. A control apparatus for an electric railcar comprising:
an electric power converter for driving a motor;
means for detecting the rotational speed of said motor;
means for controlling said electric power converter;
means for decreasing the braking torque of said motor gradually from a first braking torque to a second predetermined braking torque which is larger than zero and smaller than said first braking torque when an AND condition which indicates the brake command is in existence and the rotational speed of said motor decreases below a first predetermined speed is satisfied; and
means for maintaining the braking torque of said motor constantly to said second predetermined braking torque until the rotational speed of said motor becomes zero.

2. A control apparatus according to claim 1, wherein said control apparatus enables minimization of conduction loss of said switching elements of said electric power converter by limiting a maximum value of torque current command when an operating frequency of said electric power converter passes through a zero point and limiting a value of current flow into said switching elements so as to reduce heat loss and maintain sufficient braking force until said electric railcar stops.

3. A control apparatus for an electric railcar comprising:
an electric power converter for driving a motor;
means for detecting a rotational speed of said motor;
means for controlling said electric power converter;
means for creating PWM signals with a first carrier frequency;
means for controlling switching elements constituting said electric power converter using said PWM signals; and
means for selecting a second carrier frequency which is lower than said first carrier frequency for creation of PWM signals when an AND condition which indicates the brake command is in existence and the rotational speed of said motor decreases below a predetermined low speed is satisfied.

4. A control apparatus according to claim 3, wherein said control apparatus enables minimization of conduction loss of said switching elements of said electric power converter by reducing said carrier frequency from said first carrier frequency to said second carrier frequency when an operating frequency for control of said electric power converter passes through a zero point so as to reduce heat loss and maintain sufficient braking force until said electric railcar stops.

5. A control apparatus for an electric railcar comprising:
an electric power converter for driving a motor;
means for detecting a rotational speed of said motor;
means for controlling said electric power converter;
means for decreasing the braking torque of said motor gradually from a first predetermined braking torque to a second braking torque which is larger than zero and smaller than said first braking torque when an AND condition which indicates the brake command is in existence and the rotational speed of said motor decreases below a first predetermined speed is satisfied;
means for maintaining the braking torque of said motor constantly to said second predetermined braking torque until the rotational speed of said motor becomes zero;
means for creating PWM signals with a first carrier frequency;
means for controlling switching elements constituting said electric power converter using said PWM signals; and
means for selecting a second carrier frequency which is lower than said first carrier frequency for creation of PWM signals when an AND condition which the brake command is in existence and the rotational speed of said motor decreases below a predetermined low speed is satisfied.

6. A control apparatus according to claim 5, wherein said control apparatus enables minimization of conduction loss of said switching elements of said electric power converter by limiting a maximum value of torque current command when an operating frequency of said electric power converter passes through a zero point by limiting a value of current flow into said switching elements, and by reducing said carrier frequency from said first carrier frequency to said second carrier frequency when the operating frequency for control of said electric power converter passes through the zero point so as to reduce heat loss and maintain sufficient braking force until said electric railcar stops.

7. A control apparatus according to claim 3, wherein said second carrier frequency is higher than 100 Hz and lower than 500 Hz.

8. A control apparatus according to claim 5, wherein said second carrier frequency is higher than 100 Hz and lower than 500 Hz.

* * * * *